United States Patent [19]
Denk et al.

[11] 4,237,149
[45] Dec. 2, 1980

[54] METHOD OF MANUFACTURING MOLDED AND IMPREGNATED PARTS

[75] Inventors: Hans Denk, Gauting; Reiner Habrich, Heimstetten near Munich, both of Fed. Rep. of Germany

[73] Assignee: Siemens Aktiengesellschaft, Munich, Fed. Rep. of Germany

[21] Appl. No.: 935,103

[22] Filed: Aug. 21, 1978

[30] Foreign Application Priority Data

Aug. 29, 1977 [DE] Fed. Rep. of Germany ....... 2738890

[51] Int. Cl.² .................. B05D 5/12; B29B 3/00; H02G 13/08
[52] U.S. Cl. .................. 427/58; 427/386; 264/272; 174/52 PE; 174/110 E; 528/93; 528/99; 525/507
[58] Field of Search .......... 427/58, 386; 528/93, 528/99, 135; 264/272; 260/830 TW; 174/52 PE, 110 E; 336/96; 525/507

[56] References Cited

U.S. PATENT DOCUMENTS

| | | | |
|---|---|---|---|
| 2,887,458 | 5/1959 | Fitzgerald et al. | 427/386 |
| 3,484,398 | 12/1969 | Childs | 260/830 TW |
| 3,497,524 | 2/1970 | Payne et al. | 528/93 |
| 3,560,388 | 2/1971 | Higashi | 260/830 TW |

FOREIGN PATENT DOCUMENTS 352913  11/1972  U.S.S.R. .................. 528/99

*Primary Examiner*—Ronald H. Smith
*Assistant Examiner*—Richard Bueker
*Attorney, Agent, or Firm*—Kenyon & Kenyon

[57] ABSTRACT

For manufacturing molded and impregnated parts from epoxy resin compositions, a reactive epoxy resin is employed which hardens more slowly at higher temperatures (120° to 180° C.) than at lower temperatures (80° to 110° C.). The reactive epoxy resin composition is applied at the higher temperature and subsequently hardened at the lower temperature.

According to the method of the invention, molded parts (e.g., solution pump heads), cast-in electrical components (e.g., four-ring stray field electrodes) and impregnated parts are manufactured.

8 Claims, No Drawings

# METHOD OF MANUFACTURING MOLDED AND IMPREGNATED PARTS

BACKGROUND OF THE INVENTION

This invention relates to a method for casting-in or impregnating electrical components and for casting with epoxy resin compositions.

As is well known in the art, casting and impregnating resins, such as epoxy resins, harden faster at higher temperatures than at lower temperatures. Hardening at low temperatures is possible only in the presence of basic catalysts, particularly aliphatic and aromatic amines.

Reactive epoxy resin compositions used for casting-in and impregnating, filled and not filled, should have low viscosity for the manufacture of moldings, so that good impregnation is obtained. The desired low viscosity can be obtained by using low-molecular weight components, low-molecular weight reactive and nonreactive substances or also by employing the given resin compositions at a higher temperature, i.e. by the viscosity reduction which sets in with increasing temperature.

However, low-molecular components of the epoxy resin compositions, for example, reactive thinners such as butane dioldiglycidyl ether, cresylglycidyl ether, phenylglycidyl ether and butylglycidyl ether, cause high reaction shrinkage during hardening, which is usually accompanied by a strongly exothermic heat reaction, and the moldings obtained are brittle. Low-molecular non-reactive components such as solvents, softeners and the like can cause additional shrinkage in the molded articles due to evaporation, porosity, tension cracks, migration, poor temperature aging behavior, etc. While the viscosity of the composition is lowered by the process-related measure of increasing the temperature, the increase in the speed of the reaction connected therewith makes the viscosity of the composition increase rapidly, whereby the processing time of the compound is shortened.

It is known to use tertiary amines such as triethanol amine, benzyldimethyl amine and 2,4,6-tris-(dimethylaminomethyl)-phenol as hardening agents for polyepoxides and as accelerators in the hardening of mixtures of polyepoxides and polycarbonic acid anhydrides at elevated temperatures.

SUMMARY OF THE INVENTION

It is an object of the invention to describe a method for the manufacture of molded and impregnated parts, in which the disadvantages described do not occur, and which makes possible, at higher temperatures and, therefore, lower viscosity, sufficient processing time with shorter mold activation times, and with which the processing of larger resin batches can still be controlled adequately.

According to the invention, this problem is solved through the use of a reactive epoxy resin composition which hardens more slowly in the temperature range of about 120° to 180° C. than at temperatures in the range of about 80° to 110° C., and which is applied to a mold or material to be impregnated at the higher temperature and is subsequently hardened at the lower temperature. Suitable epoxy resin compositions contain no low-molecular reactive thinners and no nonreactive softeners, solvents and the like. They harden faster at a lower temperature than at elevated temperature. The reactive components are to be high-molecular to the extent possible. Especially well suited are epoxy resin compounds of the bisglycidyl ether type of bisphenol A together with a tertiary amine. However, it was also possible to obtain these properties with epoxized Novolak resins and mixtures of the latter with bisglycidyl ethers of bisphenol A.

For carrying out the method according to the invention, the casting or impregnating is preferably done at a temperature in the range of from about 120° to 180° and the hardening at temperatures in the range of from about 80° to 110° C. With a casting resin composition of the type bisglycidyl ethers of bisphenol A and 2,4,6-tris-(dimethylaminomethyl)-phenol as an addition catalyst, a maximum for the hardening rate is reached at 100° C.; the minimum is at about 160° C.

In some cases it has been found to be particularly advantageous to add to 30 parts by weight of reactive compound up to 70 parts by weight of filler. Suitable fillers are, for example, kaolin, silica, quartz powder, aluminum oxide trihydrate, titanium oxide (rutile), glass fibers or graphite.

With the method according to the invention, longer processing times can be obtained with low viscosity of the casting resin composition. This makes possible a larger addition of filler. The hardening cycle can be controlled by controlling the temperature similarly to the pressure gelating method. As the reaction speed is slowed down again with an increase in the exothermic effect, even large batches of resin can still be processed well. A very important advantage, finally, is the long use time at higher temperatures particularly for impregnating without solvent.

The method according to the invention is suitable for the manufacture of molded parts such as solution pump heads, fuel cell frames and cast-in electrical components such as, for example, four-ring stray field electrodes, as well as also for impregnating porous materials and electrical components such as coils, transformers and capacitors.

DETAILED DESCRIPTION OF THE INVENTION

The invention will be illustrated in further detail by the following examples.

EXAMPLE 1

With a composition consisting of 100 parts by weight of a bisglycidyl ether of bisphenol A with an epoxy value of 0.50 to 0.55 and 2 parts by weight, 2,4,6-tris-(dimethylaminomethyl)-phenol, it was possible to remove cast parts from the mold after 40 minutes at 100° C. At 150° C., the reactive mass remained usable for about 50 minutes.

EXAMPLE 2

With a composition consisting of 50 parts by weight of a bisglycidyl ether of bisphenol A with an epoxy value between 0.20 and 0.30 and 50 parts by weight of a bisglycidyl ether of bisphenol A with an epoxy value between 0.56 and 0.59 and 1.5 parts by weight 2,4,6-tris-(dimethylaminomethyl)-phenol, molded parts were obtained that could be removed from the mold at 100° C. within 10 minutes. The use time of the reactive compound was about 50 minutes at 140° C.

What is claimed is:

1. A method for casting-in or impregnating electrical components and for casting with epoxy resin compositions, comprising applying to a mold or component to be impregnated a reactive epoxy resin composition, comprised of an epoxy resin and a tertiary amine, at a temperature in the range of from about 120° C. to about 180° C., and hardening said resin composition at a temperature in the range of from about 80° C. to about 110° C., wherein said epoxy resin composition hardens more slowly in the temperature range of from about 120° C. to about 180° C. than at temperatures in the range of from about 80° C. to about 110° C.

2. The method according to claim 1 wherein said epoxy resin is the bisglycidyl ether of bisphenol A.

3. The method according to claim 1 wherein said reactive epoxy resin composition comprises an epoxized Novolak resin.

4. The method according to claim 1 wherein said reactive epoxy resin composition comprises a mixture of epoxized Novolak resin and the bisglycidyl ether of bisphenol A.

5. The method according to claim 1 wherein said tertiary amine comprises 2,4,6-tris-(dimethylaminomethyl)-phenol.

6. The method according to claim 1 wherein said reactive epoxy resin composition comprises about 50 parts by weight bisglycidyl ether of bisphenol A with an epoxy value between about 0.55 and 0.59, about 50 parts by weight of a bisglycidyl ether of bisphenol A having an epoxy value between about 0.2 and 0.3, and about 1.5 parts by weight 2,4,6-tris-(dimethylaminomethyl)-phenol.

7. The method according to claim 1 wherein up to about 70 parts by weight of filler are added to 30 parts by weight of reactive epoxy resin composition.

8. The method according to claim 1 wherein said reactive epoxy resin composition comprises about 100 parts by weight of a bisglycidyl ether of bisphenol A with an epoxy value of 0.50 to 0.55 and 2 parts by weight 2,4,6-tris-(dimethylaminomethyl)-phenol.

* * * * *